ns
[11] 3,633,997

| [72] | Inventor | George W. Hrbek<br>1501 East Sunset Terrace, Arlington<br>Heights, Ill. 60004 |
|---|---|---|
| [21] | Appl. No. | 68,833 |
| [22] | Filed | Sept. 2, 1970 |
| [45] | Patented | Jan. 11, 1972 |

[54] LIGHT-SOUND INTERACTION CELL
3 Claims, 2 Drawing Figs.

| [52] | U.S. Cl. | 350/161 |
|---|---|---|
| [51] | Int. Cl. | G02f 1/32 |
| [50] | Field of Search | 350/161 |

[56] References Cited
UNITED STATES PATENTS

| 2,287,587 | 6/1942 | Willard | 350/161 |
|---|---|---|---|
| 3,035,491 | 5/1962 | Rosenthal et al. | 350/161 |
| 3,372,973 | 3/1968 | Flinchbaugh | 350/161 |
| 3,399,013 | 8/1968 | Aas et al. | 350/161 |

*Primary Examiner*—Ronald L. Wibert
*Assistant Examiner*—J. Rothenberg
*Attorney*—John J. Pederson ABSTRACT: A light-sound interaction cell which includes a liquid light-sound interaction medium is heated to a temperature above that of the ambient room temperature, to decrease loss of acoustic energy within the liquid. To further optimize the functioning of the cell, the region of the medium in which the light and sound are made to interact is isolated from the remainder of the medium by one or more baffles fixedly positioned within the medium.

PATENTED JAN 11 1972　　　　　　　　　　　3,633,997

Inventor
George W. Hrbek

By John J. Pederson
Attorney

LIGHT-SOUND INTERACTION CELL

BACKGROUND OF THE INVENTION

This invention relates to light-sound interaction cells and in particular improvements in such cells for better efficiency and functioning. A description of such cells may be found in "A Television Display Using Acoustic Deflection and Modulation of Coherent Light," by A. Korpel, R. Adler, P. Desmares and B. Watson, Proc. IEEE, Vol. 54 (Oct. 1966), pp. 1429-37. At present many optical applications and systems exist of which light-sound interaction cells form the basic component. Such systems are described in the aforementioned paper and in "An Improved Laser Color T.V. System Using Acousto-Optic Interaction," by G. Hrbek, J. Lekavich and B. Watson, a digest of which appears in the Digest of Papers submitted at the 1970 IDEA Symposium, Information Display, Evolution and Advances, Society for Information Display, May 1970, pp. 40-41. In such systems, the efficiency and precision of operation of light-sound interaction cells, such as Bragg cells, are crucial. For example, the resolution obtainable with the above laser T.V. system is directly dependent on the efficiency of the acoustic-optic interactions, while the definition and clarity of the image depends on many factors, but of particular importance are the dimensional stability of the output beam and the precision of the focus as it is scanned.

SUMMARY OF THE INVENTION

It is therefore an object of the present invention to provide an improved light-sound interaction cell.

It is a more specific object of the present invention to provide improvement in light-sound interaction cells to increase light-sound interaction efficiency while improving the stability and focus of diffracted light beams produced by the cell.

In a light-sound interaction cell for use with a beam of coherent monochromatic light and including a sound transducer responsive to an applied signal and a sound-transmitting fluid in which the sound transducer propagates acoustic wave fronts on a path transverse to the light beam to diffract the light, the improvement comprises means including a heating element for raising the temperature of the fluid to reduce dissipation of acoustic energy in the fluid and means for stabilizing the temperature immediately about the region within the fluid wherein the acoustic wave fronts and the light beam interact to give rise to said diffraction.

BRIEF DESCRIPTION OF THE DRAWING

The features of the present invention which are believed to be novel are set forth with particularity in the appended claims. The invention, together with further objects and advantages thereof, may best be understood by reference to the following description taken in connection with the accompanying drawing, in the several figures of which like reference numerals identify like elements, and in which:

DESCRIPTION OF THE PREFERRED EMBODIMENT

Figure 1:
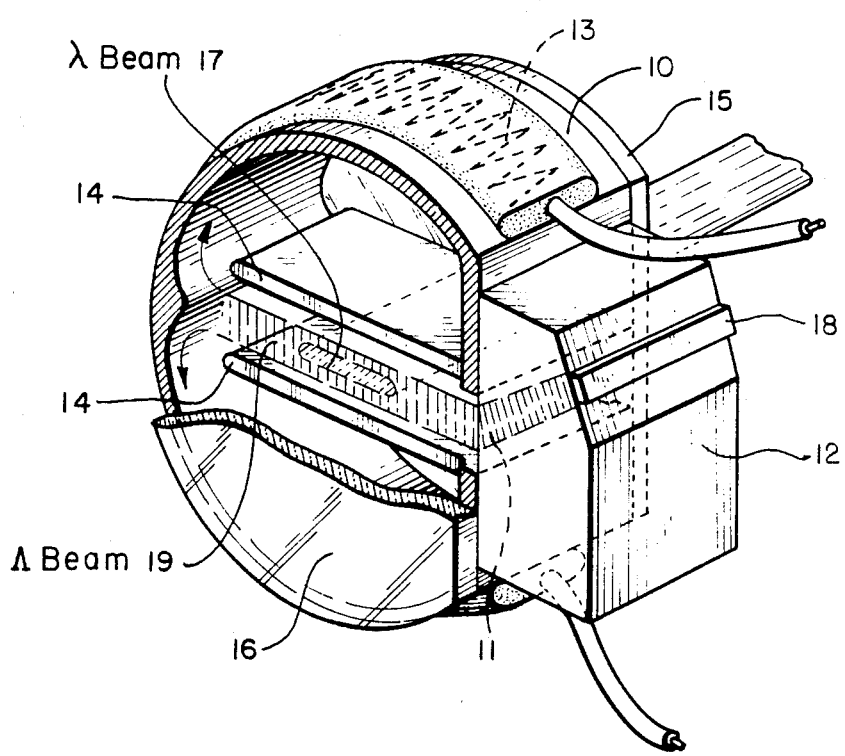
FIG. 1 is a perspective view of a simplified improved light-sound interaction cell constructed in accordance with the invention.

Referring to FIG. 1, a light-sound interaction cell is shown which includes a metallic hollow cylindrical tube 10 having an elongated flattened portion on its periphery and a longitudinal slot 11 within this flattened portion. Over the flattened portion and slot of tube 10 a glass block 12 is attached to which is bonded a sound transducer 18 such as a piezoelectric crystal, which in turn is connected to a source of high-frequency electrical signals. With the exception of the region over which the glass block bearing the transducer is attached, the entire outer cylindrical surface of the tube 10 is wrapped with an electric heating element 13. Two baffle plates 14, parallel to each other and affixed to the inner wall of tube 10 on opposite sides of slot 11 and which may be, for example, of glass or metal, extend longitudinally and parallel to the axis of the tube 10 as well as parallel to a cylindrical radius of the container, so that a channel is formed between the plates having the slot 11 at its entrance and extending along a diameter of the tube 10. Of course the plates 14 may be continuous with, and interior extensions of, the flattened portion of the metallic wall of the cylindrical tube 10, as shown in the Figure. Light-transmissive glass faceplates 15 and 16 are affixed to the ends of the cylindrical tube to form a container which is filled with a light-transmissive sound-conducting liquid medium, preferably water.

Figure 2:
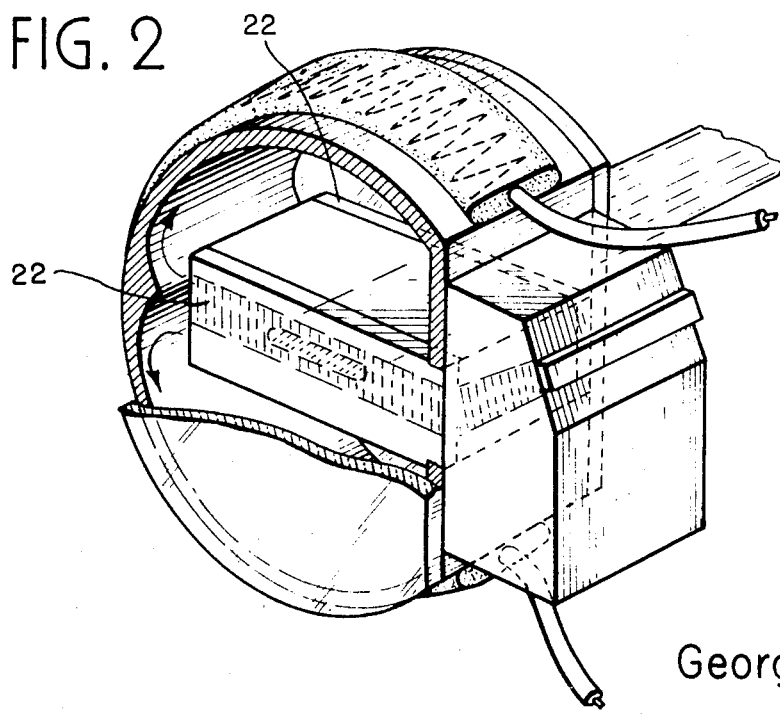
FIG. 2 is a perspective view of a more elaborate alternative improved light-sound interaction cell according to the invention.

The construction of the embodiment of FIG. 2 is the same as FIG. 1, except that in addition, two small glass baffle plates or windows 22 are added between the glass plates which are parallel to the faceplates 15 and 16 and spaced along the axis of the tube 10 so that they enclose slot 11 and the region between the parallel plates 14 becomes an enclosed channel opening into the liquid medium at the end opposite slot 11. The faceplates 15 and 16 may themselves serve in place of baffles 22 to create a closed rectangular channel open only at the end opposite slot 11.

In operation, an electric current is passed through the heating element 13 to heat the tube and thus the water medium contained within the cell, to a temperature higher than the ambient room temperature, preferably 75° C. A beam of coherent monochromatic light whose cross section is shown at 17 is passed into the cell through the rear faceplate 15 between the parallel baffles 14 to emerge from the front faceplate 16. When the transducer 18 is energized with an appropriate electrical signal, plane sound wave fronts, depicted schematically at 19, are propagated in the glass block 12, enter the water through slot 11, and travel along the channel in the radial direction between the baffle plates 14 and, in the case of the FIG. 2 embodiment, between plates 22, until being dissipated in the remainder of the water medium. Thus the light beam and sound wave fronts are made to propagate transversely with respect to each other and to interact in the region within the channel between plates 14. The sound wave fronts act upon the light as a diffraction grating in the usual manner of such cells to diffract the light which then emerges from the second faceplate.

As is well known, the light-sound interaction cell may be operated so as to obtain Bragg diffraction and scanning of an incident light beam through a range of scan angles varying with the frequency of the signal applied to transducer 18, in accordance with the Bragg formula:

$$2\alpha \approx \lambda F/v$$

where $2\alpha$ is the angle between the diffracted and undiffracted light, $\lambda$ is the wavelength of the light, $F$ is the frequency of the sound, and $v$ is the sound velocity. As is usually the case in light-sound interaction cells, the physical orientation of the cell or of the light beam and sound wave fronts, is irrelevant so long as the conditions for the desired light-sound interaction are maintained. In the Bragg case, one definition of the resolution of the cell which is commonly given is the total scan angle, which from the Bragg formula is a function of the total frequency range $\Delta F$ of the applied signal, divided by the diffraction-limited spot size of the emergent diffracted beam. Then one means of improving the resolution attainable by a light-sound interaction cell would be to increase the frequency range $\Delta F$ of the applied signal. However, the extent to which it is possible to do this is strictly limited by the inevitable increase in the absorption of acoustic energy in the medium with the increase in frequency of the energy. For example, in the cell at room temperature (25° C.), the acoustic absorption of the water medium with the transducer 18 driven at 28 MHz. is 1.5 db. per cm., while at 48 MHz., it rises to a prohibitive 4.3 db. per cm.

However, it has been observed that the absorption of acoustic energy in water and certain other liquids, such as ethyl alcohol, is diminished as the temperature is increased, within certain ranges; see J. M. M. Pinkerton, "The Absorption of Ultrasonic Waves in Liquids and its Relation to Molecular Constitution," Proc. of the Royal Society, London, 1947. This principle is extended and applied to the improvement of the resolution capabilities of the cell by heating the water medium to a temperature of 75° C. It is then found that the acoustic absorption losses at 48 MHz. are reduced from 4.3 db. per cm. to 1.57 db. per cm., so that the use of the higher drive signal frequency becomes practical and a large increase in resolution capability is immediately achieved.

The functioning of the cell is further optimized by the baffle plates 14 of FIG. 1 and plates 22 of FIG. 2 in that they stabilize the temperature of the heated fluid within the region or channels which they enclose, which encompasses the entire light-sound interaction region. When no such baffles are used, it is difficult if not impossible to prevent spurious internal thermal and vibrational effects from imposing upon the light diffracted by the cell an intermittent defocusing, i.e., the diameter of a diffracted light beam varies in size with time in an unpredictable manner at a given image plane. The effect is a definite annoyance when the cell is used for precision applications such as optical beam scanning and image reproduction. The baffles prevent such degradation of the diffracted output when placed within the fluid so that they tend to isolate the light-sound interaction region from the remainder of the internal volume of the cell without hindering the propagation of the sound wave front, or the passage of the light beam through the cell.

Although in the FIG. 2 embodiment, plates 22 lie across the path of the light beam, the index of refraction of the clear glass at 1.52 nearly matches that of the water at 1.33 so that practically no impediment or deviation is imposed on the light beam. The FIG. 2 embodiment is more effective in isolating the light-sound interaction region from the remainder of the cell volume and thus in stabilizing the temperature of the fluid within the interaction region, since with the addition of the plates 22 the interaction region is completely enclosed, except for the opening at the end opposite the transducer to allow the propagating sound wave fronts to exit from the interaction region. Of course, the FIG. 2 embodiment is only one example of the use of an enclosure fixed within the sound cell and surrounding the path of the propagating sound waves except for an opening to allow the propagating sound wave fronts to exit, thus mechanically isolating the interaction region; many other such configurations are possible in a sound cell constructed according to the invention.

It is thought that the desirable results attained through the use of the baffle plates may be explained in terms of the mechanical barrier which such baffles constitute to convection currents in the fluid set in motion by thermal gradients, as well as to vibrational disturbances, both of which would otherwise be transmitted throughout the fluid and cross the interaction region. Thus without the baffles a small random temperature variation would be present across the interaction region, varying the acoustic absorption accordingly over the region and giving rise to the intermittent defocusing discussed above.

Thus only rather simple modifications and additions to the usual light-sound interaction cell are required to implement the invention which may be accomplished without interfering with the broader features of present designs. Yet an enormous improvement in the functioning and efficiency of such cells compared to those not incorporating the features of the invention is obtained, particularly in the areas of light-sound interaction efficiency and improvement in the precision and definition of the diffracted components as well as in the resolution of the cell.

While a particular embodiment of the invention has been shown and described, it will be obvious to those skilled in the art that changes and modifications may be made without departing from the invention in its broader aspects and, therefore, the aim in the appended claims is to cover all such changes and modifications as fall within the true spirit and scope of the invention.

I claim:
1. In a light-sound interaction cell for use with a beam of coherent monochromatic light and including a sound transducer responsive to an applied signal and a sound-transmitting fluid in which the sound transducer propagates acoustic wave fronts on a path transverse to said light beam to diffract said light, the improvement comprising:
  means including a heating element for raising the temperature of said fluid to reduce dissipation of acoustic energy in said fluid;
  and means for stabilizing the temperature immediately about the region within said fluid wherein said acoustic wave fronts and said light beam interact to give rise to said diffraction.

2. An improved light-sound interaction cell as in claim 1, in which said means for stabilizing the temperature in the region of interaction comprises:
  a pair of baffles fixedly placed within said cell enclosing said acoustic wave front propagation path and mechanically isolating the interaction region to hinder the transmission of thermal and vibrational disturbances through said region.

3. An improved light-sound interaction cell as in claim 1, in which said means for stabilizing the temperature in the interaction region comprises:
  an enclosure fixed within said cell surrounding said interaction region, said enclosure being provided with an opening to allow said propagating acoustic wave fronts to exit from said region and transmitting said light beam through said interaction region, said enclosure mechanically isolating the interaction region to hinder the transmission of thermal and vibrational disturbances through said region.

* * * * *